Patented Sept. 20, 1932

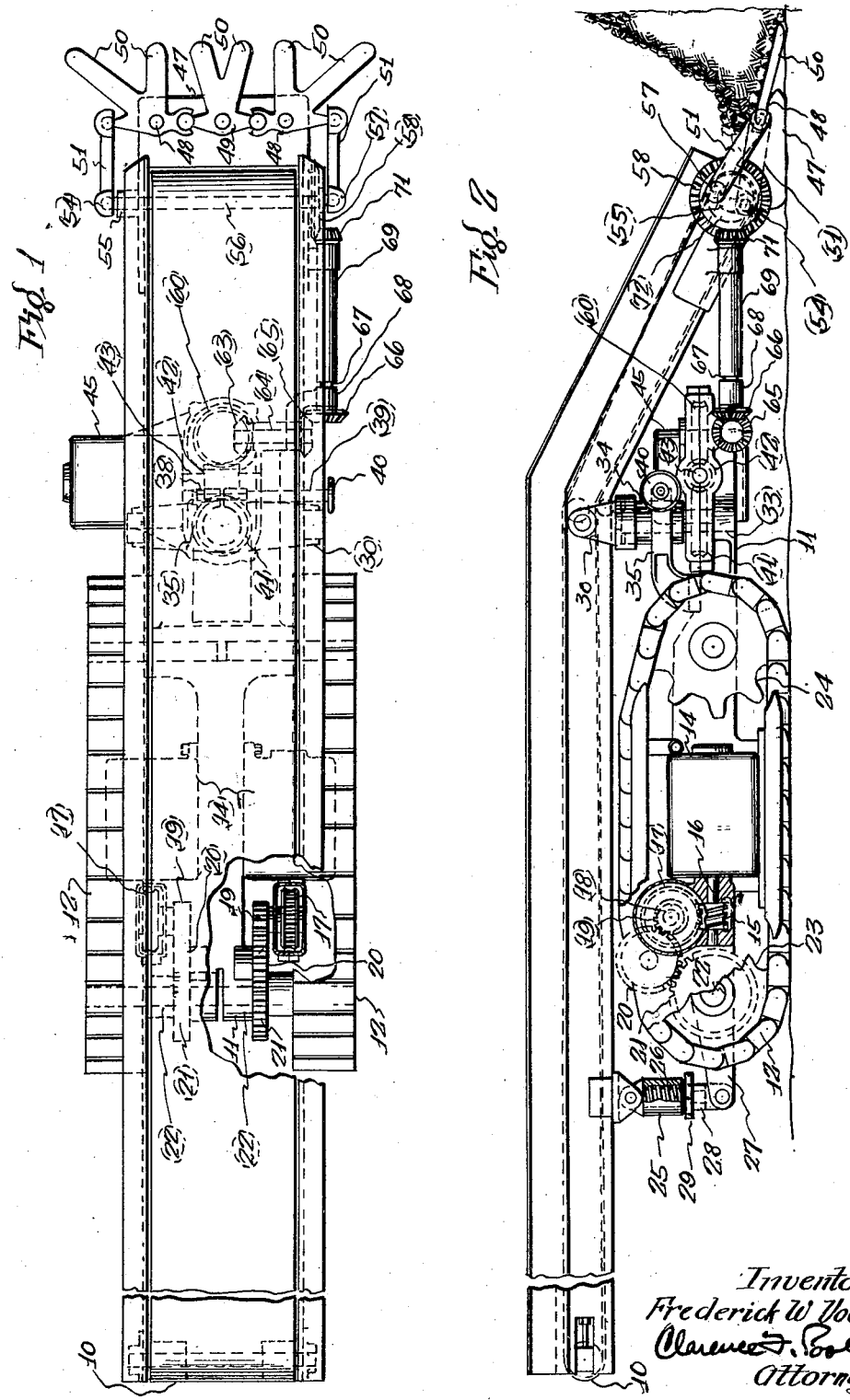

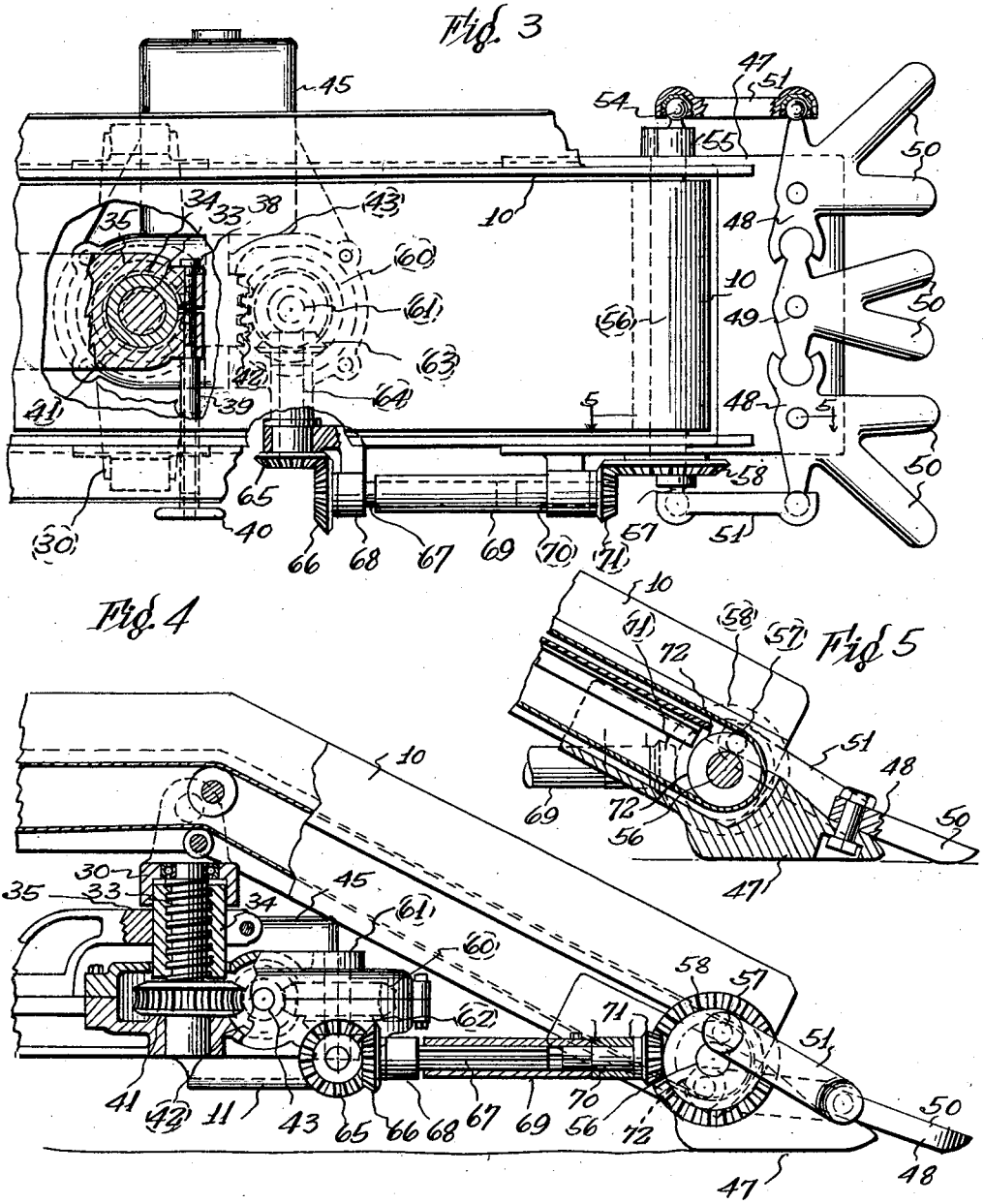

1,878,037

UNITED STATES PATENT OFFICE

FREDERICK W. VODOZ, OF WILMETTE, ILLINOIS, ASSIGNOR TO GOODMAN MANUFACTURING COMPANY, OF CHICAGO, ILLINOIS, A CORPORATION OF ILLINOIS

LOADING MACHINE

Application filed April 8, 1929. Serial No. 353,286.

This invention relates to improvements in loading machines and more particularly to loading machines such as are used in mines and are adapted to be fed into the loose material to deposit it upon a travelling conveyor for discharge into cars or the like.

One of the principal objects of my invention is to provide an improved mechanism which agitates the loose material so that said loose material may be gathered or deposited upon a travelling conveyor as the loading machine is fed into said loose material. This agitating mechanism comprises a plurality of fingers on the forward portion of the loading machine reciprocably movable transversely of said loading machine.

Other objects of my invention will appear from time to time as this specification proceeds.

My invention may be more clearly understood with reference to the accompanying drawings wherein:

Figure 1 is a top plan view of the device embodying my invention with parts broken away and in section to more clearly show the details of my invention;

Figure 2 is a side elevation of the device shown in Figure 1 with parts broken away and in section;

Figure 3 is an enlarged fragmentary plan view of the device shown in Figure 1 with parts broken away and in section to more clearly show the details of my invention;

Figure 4 is an enlarged fragmentary side elevation of the device shown in Figure 1 with parts broken away and in section to more clearly show the details of my invention; and Figure 5 is a sectional view taken on line 5—5 of Figure 3.

Like numerals refer to like parts throughout the various figures.

Referring now to the details shown in the drawings, the device embodying my invention comprises a conveyor apparatus which may be of any suitable construction so as to include a belt conveyor 10. In the form shown the apparatus includes a main frame 11 having continuous tread traction devices 12, 12, for moving the apparatus over the mine floor. The conveyor is suitably mounted on the main frame 11 by a plurality of pivotal connections at the forward and rearward ends thereof which permits the conveyor to be tilted longitudinally of the machine.

A separate motor 14 is provided for driving each continuous tread traction device 12. The motors 14 are mounted on the main frame 11 and have driving connection with the continuous tread traction devices 12 through a suitable gear train of an ordinary type which will herein be described for one motor 14 only since the driving connection from each motor 14 to each continuous tread traction device 12 is substantially the same.

A worm 15 is mounted on a motor shaft 16 and drives a worm gear 17 on a transverse shaft 18. A spur pinion 19 is keyed on the transverse shaft 18 and driven thereby and meshes with and drives an idler gear 20 which in turn drives a spur gear 21 on a transverse shaft 22 which drives said shaft. A sprocket 23 is fixed on the transverse shaft 22 and is driven thereby. The sprocket 23 meshes with and drives the continuous traction device 12 which is also threaded over an idler sprocket 24 near the forward end of the main frame 11.

It may now be seen that I have provided an independent drive for each continuous traction device 12 dispensing with mechanical clutches and that when it is desired that the apparatus move forwardly along the mine floor in a straight line that power is applied to the motors 14, 14, simultaneously, and that when it is desired to turn the apparatus in one direction or another, power is turned off from one or the other of said continuous traction devices in the usual manner.

The rearward pivotal connection of the conveyor 10 to the main frame 11 is adjustable so that said conveyor may be tilted about its forward pivotal axis, and comprises an internally threaded member 25 pivoted to the lower portion of the conveyor 10 having an adjusting screw 26 threaded therein. The adjusting screw 26 is supported on a projection 27 from the main frame 11 on a member 28 pivotally connected thereto. A collar 29 having a plurality of holes therein is provided to rotate the adjusting screw 26 to pivot the conveyor 10 about its forward pivotal axis.

Likewise the forward pivotal connection of the conveyor 10 to the main frame 11 is adjustable so that said conveyor may be tilted about its rearward pivotal axis. The forward portion of the conveyor 10 is trunnioned on a forked supporting member 30 which is supported on the top portion of a threaded shaft 33. The threaded shaft 33 is threaded through an internally threaded sleeve 34 held in a supporting member 35 integral with the main frame 11 and is journaled in the main frame 11 at its lower portion. The supporting member 35 surrounds the threaded sleeve 34 and is split at its forward portion to allow said supporting member to be tightened on said sleeve to hold said sleeve from rotation or to loosely engage said sleeve to allow said sleeve to rotate within said supporting member.

Means are provided to tighten the supporting member 35 on the sleeve 34 which herein comprise a rod 38 threaded for a portion of its length having a head thereon abutting one side of the supporting member 35 and passing through said supporting member. A sleeve 39 abuts the opposite side of the supporting member 35 and a hand wheel 40 abuts the outer end of said sleeve and is threaded on the rod 38 so that rotation of said hand wheel in one direction or the other holds the threaded sleeve 34 from rotation on the supporting member 35 or allows said threaded sleeve to rotate in said supporting member. The threaded shaft 33 is rotated by means of a worm gear 41 feathered thereon which is driven by means of a worm 42 on a motor shaft 43 driven from a motor 45. It may here be seen that when the sleeve 34 is held stationary in the support 35 that rotation of the motor shaft 43 will rotate the threaded shaft 33 which will move through the sleeve 34 to raise or lower the forward portion of the conveyor 10 pivoting said conveyor about its rearward pivotal axis and thus providing a means to adjust the forward portion of said conveyor to irregular bottoms or raise the forward portion of said conveyor above the mine bottom when travelling from loading place to loading place.

Referring now in particular to the mechanism for agitating the mined material so it may be gathered by the belt of the belt conveyor 10, a shoe 47 is attached to the forward end of the belt conveyor 10 and projects forwardly and downwardly therefrom to engage the mine bottom. The shoe 47 is wedge shaped and extends from a point near the top portion of the belt for the conveyor 10 to the mine bottom so said shoe will ride on the mine bottom and wedge itself in under the loose material as the apparatus is moved into the loose material by means of the continuous traction treads 12.

Members 48, 48, are pivotally mounted near the outer ends of the shoe 47 and are operatively connected with opposite ends of a member 49 pivotally connected to the central portion of the shoe 47 adjacent the forward end thereof so that pivotal movement of one member 48 will cause pivotal movement of the member 49 and the opposite member 48. A plurality of material agitating members herein preferably shown as fingers 50, 50, project forwardly and outwardly from the members 48, 48, and 49 to a point adjacent the mine bottom. Connecting rods 51, 51, actuated by suitable crank means are provided to move the members 48, 48, and 49 about their pivotal axes. As herein shown the connecting rods 51 are connected to the outer ends of the members 48, 48, by means of ball and socket joints of an ordinary construction. The connecting rod 51 on one side of the apparatus is connected to a crank pin 54 on the end of a crank 55 keyed to a transverse driving shaft 56 by means of a ball and socket joint of an ordinary type. Likewise the opposite connecting rod 51 is connected to a crank pin 57 by means of a ball and socket joint of an ordinary type. The crank pin 57 is connected to a bevel gear 58. The crank pins 54 and 57 are 180 degrees apart so that rotation of said crank pins will uniformly reciprocably move the members 48, 48, and 49 about their pivotal axes to agitate the loose material as said members and fingers 50, 50, are fed into the loose material by means of the continuous traction tread devices 12, 12.

The conveyor belt of the belt conveyor 10 and the members 48, 48, and 49 are driven from the motor 45 by means of a suitable gear train which is as follows:

The worm 42 on the motor shaft 43 drives a worm gear 60 forwardly of said worm on a vertical shaft 61. A bevel gear 62 is keyed on the vertical shaft 61 beneath the worm 42 and drives a bevel gear 63 on a transverse shaft 64. A bevel gear 65 is on the outer end of the transverse shaft 64 and meshes with and drives a bevel gear 66 on a splined shaft 67. The splined shaft 67 is journaled in a member 68 which is pivoted so as to be pivotally movable about the axis of the transverse shaft 64 to allow the splined shaft 67 and bevel gear 66 to be axially movable about the bevel gear 65 and transverse shaft 64. The splined shaft 67 is slidable within and drives a sleeve 69 keyed on a shaft 70 journaled on the conveyor 10 for driving said shaft. A bevel pinion 71 is keyed on the forward end of the shaft 70 and drives the bevel gear 58 on the transverse shaft 56. A roller 72 is fixed on the transverse shaft 56 for driving the conveyor belt of the belt conveyor 10 in a usual manner. The members 48, 48, and 49 are reciprocably moved by means of the cranks 55 and 57 and the connecting rods 51, 51, in the manner hereinbefore described.

Figure 2 shows the apparatus of my invention gathering loose coal from the mine face. The conveyor is adjusted so that the shoe 47 has engagement with the mine bottom and the fingers 50 are reciprocably moved by means of the motor 45 about the axis of the members 48, 48, and 49, respectively. As these fingers are being reciprocably moved they are fed into the loose material by means of the continuous traction treads 12 thus keeping the mined coal in a loose moving state so that it can be picked up by the belt of the belt conveyor 10, and making the loading operation one continuous operation controllable by means of the continuous traction tread devices 12, 12.

While I have herein shown and described one form in which my invention may be embodied, it will be understood that the arrangement and construction of the various parts may be altered without departing from the spirit or scope of the invention. Furthermore, I do not wish to be construed as limiting myself to the specific embodiment illustrated, excepting as it may be limited in the appended claims.

I claim as my invention:

1. In an apparatus of the class described, a main frame supported on a plurality of continuous tread traction devices, a conveyor extending longitudinally over said main frame and inclined towards the mine bottom, a motor on said main frame for operating said conveyor, a shoe extending forwardly of said conveyor engageable with the mine bottom, and agitating means on said shoe projecting forwardly therefrom comprising a plurality of members pivoted thereon and operatively connected together so that pivotal movement of one of said members will cause pivotal movement of another of said members, a plurality of material agitating members projecting forwardly and outwardly from said pivotally mounted members, and means driven by said motor for operating said conveyor for reciprocably moving said material agitating members about the pivotal axis of said aforementioned members.

2. In an apparatus of the class described, a main frame supported on a plurality of continuous tread devices, a conveyor extending longitudinally over said main frame and inclined toward the mine bottom, a motor on said main frame for operating said conveyor, a shoe extending forwardly of said conveyor engageable with the mine bottom, and agitating means on said shoe projecting forwardly therefrom comprising a plurality of members pivoted thereon and operatively connected together so that pivotal movement of one of said members will cause pivotal movement of another of said members, a plurality of material agitating members projecting forwardly and outwardly from said pivotally mounted members, and crank operated means for simultaneously reciprocably moving said material agitating members about the pivotal axis of said pivotally mounted members.

3. In an apparatus of the class described, a main frame supported on a plurality of continuous tread devices, a conveyor extending longitudinally over said main frame and inclined toward the mine bottom, a motor on said main frame from operating said conveyor, a shoe extending forwardly of said conveyor engageable with the mine bottom, and agitating means on said shoe projecting forwardly therefrom comprising a plurality of members pivoted thereon and operatively connected together so that pivotal movement of one of said members will cause pivotal movement of another of said members, a plurality of material agitating members projecting forwardly and outwardly from said pivotally mounted members, a connecting rod on each outer end of said shoe pivotally connectible with the outer end of a portion of said members, and crank means for actuating said connecting rods for simultaneously reciprocably moving said members and said material agitating members about the pivotal axis of said members.

4. In an apparatus of the class described, a main frame supported on a plurality of continuous tread traction devices, a conveyor extending longitudinally over said main frame, and pivotally connectible therewith at the forward and rearward end thereof for pivotal movement about axes extending transversely of said main frame, means for pivoting said conveyor about either said forward or rearward axis, a motor on said main frame for operating said conveyor, means driven by said motor for pivoting said conveyor about said rearward axis, a shoe extending forwardly of said conveyor engageable with the mine bottom, and agitating means on said shoe projecting forwardly therefrom comprising a plurality of members pivoted thereon and operatively connected together so that pivotal movement of one of said members will cause pivotal movement of another of said members, a plurality of material agitating members projecting forwardly and outwardly from said pivotally mounted members, and means driven by said motor for operating said conveyor for reciprocably moving said material agitating members about the pivotal axis of said aforementioned members.

5. In an apparatus of the class described, a main frame, a plurality of continuous tread devices for supporting and transporting said main frame, an independent motor drive for each of said continuous tread devices, a conveyor extending longitudinally over said main frame and inclined towards the mine bottom, a motor for operating said conveyor, and agitating means on the forward end of said conveyor comprising a plurality of members pivoted thereon having a plurality of material agitating members projecting outwardly therefrom, and means driven from said last mentioned motor for reciprocably moving said members and material agitating members about the pivotal axis of said members.

6. In an apparatus of the class described, a main frame, a plurality of continuous tread devices for supporting and transporting said main frame, an independent motor drive for each of said continuous tread devices, a conveyor extending longitudinally over said main frame, and pivotally connectible therewith at the forward and rearward ends thereof for pivotal movement about an axis extending transversely of said main frame, a motor on said main frame for operating said conveyor, means driven by said motor for pivoting said conveyor about said rearward axis, and agitating means on the forward end of said conveyor comprising a plurality of members pivotally mounted thereon having a plurality of material agitating members projecting outwardly therefrom, and means driven from said last mentioned motor for reciprocably moving said members and material agitating members about the pivotal axis of said members.

7. In a loading machine, a main frame having a conveyor thereon and agitating means forwardly of said conveyor comprising a plurality of fingers reciprocably movable about axes perpendicular to an inclined plane.

8. In a loading machine, a main frame having a conveyor thereon and agitating means forwardly of said conveyor comprising a plurality of interconnected fingers pivotally movable about axes perpendicular to an inclined plane.

9. In a loading machine, a main frame having a conveyor thereon, an inclined shoe projecting forwardly of said conveyor and engageable with the mine bottom, and agitating means forwardly of said conveyor comprising a plurality of fingers reciprocably movable about axes substantially perpendicular to the plane of said inclined shoe.

10. In a loading machine, a main frame having a conveyor thereon, an inclined shoe projecting forwardly of said conveyor and engageable with the mine bottom, and agitating means forwardly of said conveyor comprising a plurality of interconnected material agitating members pivotally movable about axes substantially perpendicular to the plane of said inclined shoe.

11. In a loading machine, a main frame having a conveyor thereon, an inclined shoe projecting forwardly of said conveyor and engageable with the mine bottom, and agitating means forwardly of said conveyor comprising a plurality of forwardly extending interconnected material agitating members extending along the forward end of said shoe and beyond the sides thereof pivotally movable about axes substantially perpendicular to the plane of said inclined shoe.

12. In a loading machine, a main frame having a conveyor thereon, an inclined shoe projecting forwardly of said conveyor and engageable with the mine bottom, and agitating means forwardly of said conveyor comprising a plurality of interconnected material agitating members extending forwardly adjacent the mine bottom along the forward end of said shoe and beyond the sides thereof reciprocably pivotally movable about axes substantially perpendicular to the plane of said inclined shoe.

13. In a loading machine, a main frame having a conveyor thereon, a shoe adapted to engage the mine bottom projecting forwardly of said conveyor, and agitating means disposed forwardly of said conveyor comprising a plurality of fingers reciprocably movable about axes substantially perpendicular to the plane of said shoe.

14. In a loading machine, a main frame having a conveyor thereon, a shoe adapted to engage the mine bottom projecting forwardly of said conveyor, and agitating means disposed forwardly of said conveyor comprising a plurality of interconnected material agitating members pivotally movable about axes substantially perpendicular to the plane of said shoe.

15. In a loading machine, a main frame having a conveyor thereon, a shoe adapted to engage the mine bottom projecting forwardly of said conveyor, and agitating means disposed forwardly of said conveyor comprising a plurality of forwardly extending interconnected material agitating members pivotally movable about axes substantially perpendicular to the plane of said shoe extending along the forward end of said shoe and beyond the sides thereof.

16. In a loading machine, a main frame having a conveyor thereon, a shoe adapted to engage the mine bottom projecting forwardly of said conveyor, and agitating means forwardly of said conveyor comprising a plurality of interconnected material agitating members extending forwardly adjacent the mine bottom along the forward end of said shoe and beyond the sides thereof, said material agitating members being reciprocably pivotally movable about axes substantially perpendicular to the plane of said shoe.

Signed at Chicago, in the county of Cook and State of Illinois, this 5th day of April, A. D. 1929.

FREDERICK W. VODOZ.